United States Patent [19]

Stapler

[11] 4,114,440
[45] Sep. 19, 1978

[54] TURBINE-TYPE FLOW RESPONSIVE DEVICE

[76] Inventor: W. Mead Stapler, One Dey Lane, Riverdale, N.J. 07457

[21] Appl. No.: 843,527

[22] Filed: Oct. 19, 1977

[51] Int. Cl.² .............................................. G01F 1/115
[52] U.S. Cl. .................................................. 73/231 R
[58] Field of Search ...................... 73/187, 229, 231 R

[56] References Cited

U.S. PATENT DOCUMENTS

| | | | |
|---|---|---|---|
| 3,457,782 | 7/1969 | Maeder | 73/187 |
| 3,496,770 | 2/1970 | Fassett | 73/187 |
| 3,531,988 | 10/1970 | Casani et al. | 73/187 |
| 3,771,363 | 11/1973 | Stapler | 73/231 |
| 3,880,003 | 4/1975 | Jameson | 73/230 |

*Primary Examiner*—Herbert Goldstein
*Attorney, Agent, or Firm*—Ralph R. Roberts

[57] ABSTRACT

This invention pertains to flow meters and in particular to a fluid flow measuring apparatus removably mountable in a pipe. This measuring apparatus includes a bladed turbine having a localized magnet member sealed in the turbine and as the polarization of this magnet is brought in way of a magnetic pickup a pulse is actuated. This electrical signal is read either as an increase in voltage or as a transducer which reads the number of pulses to determine the rate of flow. In particular, the present flow meter incorporates a probe which in addition to carrying a bladed turbine also carries the magnetic pickup in a stem. This probe is made so as to be removed from or inserted into a conduit for placement in the midstream of a large passageway to read the flow therethrough. The improvement provided in this invention is a replaceable turbine and a mount member carrying the bladed turbine. The improvement also includes a U-shaped support mount for the bladed turbine rather than a single post. In one embodiment the U-shaped support and probe mount are made of plastic, preferably of integral construction, for resistance to particular fluid compositions.

10 Claims, 9 Drawing Figures

TURBINE-TYPE FLOW RESPONSIVE DEVICE

CROSS REFERENCE TO A RELATED PATENT

This invention pertains to an improvement in turbine flow meters and particularly to that shown in my U.S. Pat. No. 3,771,363 as issued on Nov. 13, 1973. This issued patent is based on application Ser. No. 262,107, filed June 12, 1972.

BACKGROUND OF THE INVENTION

1. Field of the Invention

With respect to the classification of art as established in the United States Patent and Trademark Office this invention is found in the general Class entitled, "Measuring and Testing" (Class 73) and the subclass therein entitled, "turbine type with end supply and delivery" (subclass 231R). Also to be noted is the subclass entitled, "volume or rate of flow meter" (subclass 194R).

2. Description of the Prior Art

Turbine-type flow meters are generally well known and usually are constructed so as to have elongated housings in which a shaft is centrally mounted to carry the bladed turbine. On the shaft is mounted a propeller-type blade which is rotatable on this shaft. The rotational velocity of the shaft may be read or the turning blades themselves may be a function of the volume rate of the flow of the fluid. These blades, for example, as they rotate past a magnetic pickup cause a voltage or pulse to be generated each time a blade passes by the pickup. The number of pulses generated is, therefore, representative of the total volume of flow through the fluid passageway with the number of pulses per unit time being computed to indicate the volume rate of the fluid flow through the housing.

The magnetic pickup may either cause the pulses to be read and fed to a computer-type electronic apparatus to be computed as a rate of flow, or the magnetic pickup may be used to cause an electromotive force to be developed in a coil. This force is proportionate to the rate of movement of the blades so that a rate of flow can be read on a voltmeter-type instrument and the dial calibrated to indicate the rate of fluid flow. Many U.S. Patents are representative of this type of construction. For example, U.S. Pat. No. 3,101,615 to PAVONE as issued on Aug. 27, 1963 shows a magnetic pickup type of flow meter. Others of similar construction are seen in U.S. Pat. No. 2,975,635 to KINDLER as issued on Mar. 21, 1961; U.S. Pat. No. 3,177,711 to HAM as issued on Apr. 13, 1965 and U.S. Pat. No. 3,342,070 to WALCH as issued on Sept. 19, 1967.

It is to be particularly noted in these patents and in others that are known that the turbine blade is constructed so as to pass substantially close to the outer diameter of the flow meter passageway. In the reference, U.S. Pat. No. 3,771,363, which to the extent applicable is incorporated by reference into the present application, the probe carries on its end a small bladed turbine of plastic. This bladed turbine carries a ring-like magnet in its hub and in the present embodiment both ends of the turbine support shaft are mounted in a U-shaped member. This supporting end and bladed turbine are made as a replaceable and removable unit which enables a ready replacement to be made. It has been found that rough or careless handling may bend the stanchion member which carries the bladed turbine. This stanchion, as shown in U.S. Pat. No. 3,771,363, is welded to the probe housing. In the improvement, to be hereinafter more fully described, the bladed turbine is mounted in a U-shaped support as a removable and replaceable end member assembly.

In the present invention a probe carries the turbine blade on a shaft carried in a U-shaped support with the rotating blades maintained in a fixed relation to the magnetic pickup. This whole unit is carried as a probe which may readily be inserted into a pipe flange, support block, valve or the like and only requires that the turbine be positioned at the midpoint of the flow path in a pipe or conduit so as to give a reading on the velocity of the flow at this point in the stream.

SUMMARY OF THE INVENTION

This invention may be summarized at least in part by reference to its objects.

It is an object of this invention to provide, and it does provide, a turbine-type flow meter in which a lightweight bladed turbine is carried in and by a U-shaped support with the support close to the bladed turbine carrying a magnet pickup. The probe assembly is adapted for mounting in a block or a pipe component so as to be readily removable therefrom. The bladed turbine, although of a fixed diameter of rotation, is not particularly dependent upon the diameter of the conduit into which it is inserted for measuring flow.

It is a further object of this invention to provide, and it does provide, a turbine-type flow meter which provides a ready replacement of the bladed turbine end and which permits ready installation of said turbine-type flow meter into a hydraulic system. This flow meter includes a bladed turbine mounted upon the end of a probe which is inserted into the side of a pipe or conduit and positioned substantially central of the diameter of the flow passageway therein. This probe is adapted for ready mounting into standard pipelines.

It is a further object of this invention to provide, and it does provide, a turbine-type flow meter in which the bladed turbine is carried upon the extending end of the probe and having a threaded pipe support fitting at its entering end. This fitting is adapted to retain the probe in a threaded portion of a pipe wall with the probe slidably carried in a threaded collar of the probe support.

In summary, the invention provides a turbine-type flow meter in which the turbine is lightweight and is carried upon a shaft mounted and secured at both ends by a U-shaped support extending from the probe housing. The probe support or stem carries a magnetic pickup which is actuated by a magnet carried by and rotated with the bladed turbine. The bladed turbine carried by and at the end of the probe is substantially smaller than the actual passageway carrying the fluid. The shank or stem of the probe has a sufficient extent adapted to permit adjustment into a passageway which may have diameter variations of 3 to 4 or more inches in diameter.

Embodiments show two arrangements for positioning the inner alignment tube in the probe assembly. In certain fluids, metal has resistance that is less than satisfactory. Where this condition exists, the probe assembly where exposed to the fluid is made of a plastic resistant to this fluid.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the flow meter probe and a housing for carrying said probe as adopted for use in hydraulic lines and showing a preferred means of construction of a removable mounting of the probe.

This specific embodiment has been chosen for the purposes of illustration and description as shown in the accompanying drawings wherein:

BRIEF DESCRIPTION OF THE DRAWINGS

In the following description and in the claims various details will be identified by specific names for convenience; these names, however, are intended to be generic in their application. Corresponding reference characters refer to like members throughout the nine figures of the drawings.

The drawings accompanying, and forming part of, this specification disclose certain details of construction for the purpose of explanation of the broader aspects of the invention, but it should be understood that structural details may be modified without departure from the concept and principles of the invention.

Figure 1:
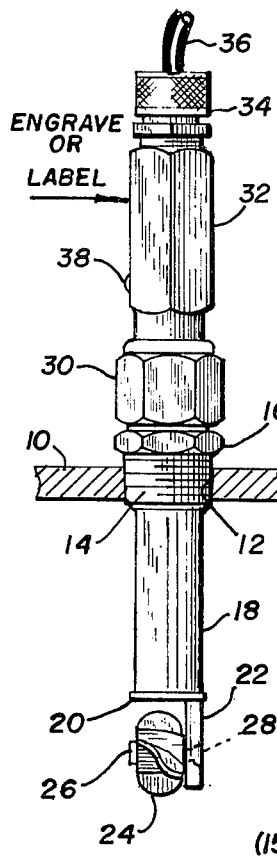
FIG. 1 represents a side view of the probe as described in my U.S. Pat. No. 3,771,363.

Description of the Probe of FIG. 1

Referring now to the drawings and in particular to FIG. 1, there is shown the probe as described in my U.S. Pat. No. 3,771,363. This is the basic concept and continues in the present improvement. As depicted, in a pipe or conduit 10 is formed a threaded aperture 12 in which a tapered hydraulic fitting 14 is mounted. This fitting includes a hex portion 16 for mounting a fitting. A SWAGELOCK (Trademark Swagelock-Crawford Fitting Company, Solon, Ohio 44139) may be used when a fixed position in the pipe is to be achieved. A fitting by LENZ (Trademark Lenz by Lenz Company, Dayton, Ohio 45401) may be used when an adjustment of the probe is to be made. The probe of FIG. 1, as shown and described in U.S. Pat. No. 3,771,363, has a probe stem 18 which extends through fitting 14 and terminates at a closed end 20. In the patented probe a stanchion member 22 is welded in place and to the end member 20. This stanchion has a hole transverse to its main axis and parallel to the plane of end 20.

A bladed turbine 24 is carried by and on a retaining shaft 26. This shaft is mounted in a hole in this stanchion and is secured by a threaded nut 28 or in a threaded hole in the stanchion. The bladed turbine is free turning when in a mounted condition on shaft 26. A hex nut 30 is manipulated to tighten the fitting 14 around the stem 18 of the probe. A hex-sided upper body 32 carries a cable connector 34 for a cable 36. A drive screw 38 aligns the axis of the bladed turbine 24 with a selected face of the upper body 32.

In the patent, above identified and as shown in FIG. 1, the stanchion extends beyond the diameter or sweep of the bladed turbine 24. In many of the installations the servicing employees are aware of not forcing the probe into the wall of the pipe. In other installations careless or deliberate mishandling of the probe in the pipe causes a bending of the stanchion 22 which may damage or make useless the bladed turbine and at the very least affects the accuracy of the probe. The present improvement provides a much stronger support for the bladed turbine and also a readily replaceable bladed turbine end.

Replaceable Bladed Turbine End of FIGS. 2 through 5

Referring next to the embodiment shown in FIGS. 2, 3, 4 and 5, there is shown a turbine mount 39 that is readily replaceable in a tubing extension or probe stem 118. This mount 39 includes a U-shaped support portion having front and rear members 40 and 42 joined by a bottom member portion 44. The front member 40 is drilled, threaded and countersunk at 46 and the rear member 42 is drilled at 48 for the retention of turbine shaft 126. The holes 46 and 48 are axially aligned to be parallel to an end portion 50. The front and rear members 40 and 42 are preferably an integral portion of this mount although they could be attached to end portion 50 as by welding. The closed U-shaped portion is much stronger and able to withstand more abuse than the stanchion arrangement of FIG. 1.

Figure 4:
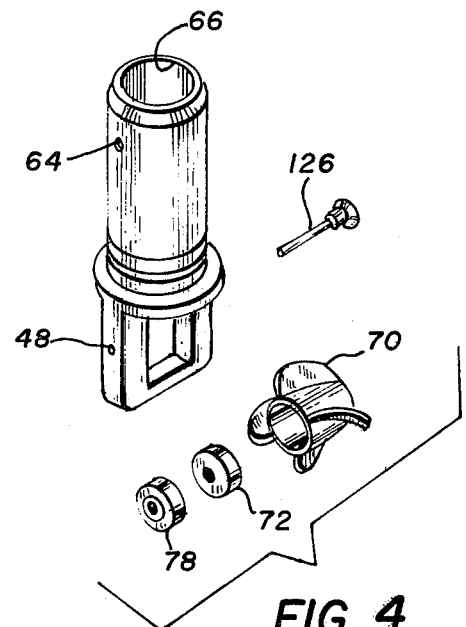
FIG. 4 represents an exploded isometric view of the turbine mount member, the bladed turbine, magnet and mounting shaft.
Figure 2:
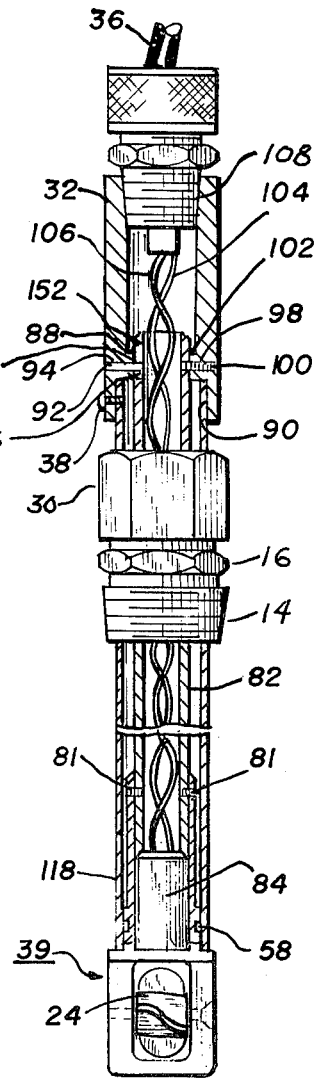
FIG. 2 represents a side view with portions broken away and in section to diagrammatically show the internal construction and arrangement of the modified probe in which the bladed turbine and mount are removably mounted in the end of the outer tube of the probe.
Figure 3:
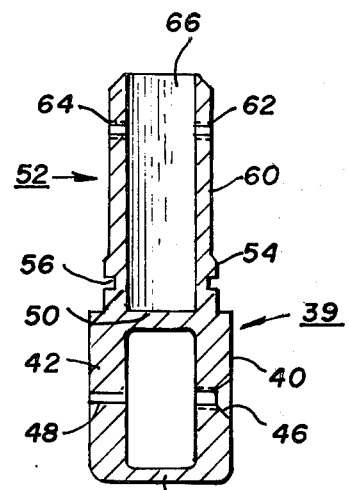
FIG. 3 represents a slightly enlarged sectional side view of the U-shaped turbine mount member of FIG. 2.

Above end 50, as seen in FIGS. 3 and 4, is formed a tubular portion generally identified as 52. This portion is a slip fit into the tube 118. In an enlarged, lower portion 54 is formed a groove 56 for retaining and mounting an O-ring 58 seen in the assembly of FIG. 2. In an upper reduced diameter portion 60 of mount 39 is formed two tapped holes 62 and 64 which, as shown, are parallel with the axis of holes 46 and 48 formed in the members 40 and 42. A cavity 66 is formed in this upper portion 52. The bladed turbine 24 is rotatably mounted on shaft 126 which is a threaded fit into hole 46 and at its reduced end is a sliding fit in hole 48.

Figure 5:
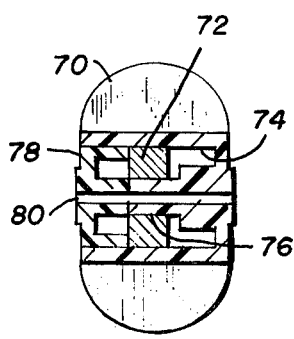
FIG. 5 represents a sectional side view of the bladed turbine and showing the preferred inner construction of the bladed turbine.

The bladed turbine 24 is shown in detail in FIGS. 4 and 5 and in the present assembly includes a bladed body 70 in which an ALNICO (Trademark of General Electric Company) ring magnet 72 is mounted in a cavity 74 formed in the central portion of the hub. The magnet is retained in the cavity by means of a spindle portion 76 and an end plug 78. This plug 78 is secured in and sealed in place by ultra-sonic or spin-welding. When the bladed turbine member 70 and plug 78 are of Delrin or PVC, an ultra-sonic weld is used. When member 70 and the end plug 78 are of polypropylene a spin-weld is used. After the seal weld has been aligned, a clean drilled hole 80 is made through this assembly. In this preferred manner a dynamically balanced bladed turbine assembly 24 is provided. The sealed end plug 78 insures that the magnet is protected from water or chemicals when immersed in the flow of fluid being measured.

Referring next to the assembly as depicted in FIG. 3, there is shown a side view with a portion broken away to show the interior arrangement of the probe. Outer tube 118 of the stem extends through the hydraulic connector 14 and nut 30 and is open to the bottom for the insertion of the turbine mount 39, as seen in FIGS. 2, 3 and 4. O-ring 58 in groove 56 is a press fit into the finished inner diameter of tube 118 and provides the fluid seal of mount 39 in the tube 118. In the upper portion 52 of the mount 39 is provided the threaded holes 62 and 64. These holes carry socket-headed set screws 81 which are caused to enter appropriately formed holes in an inner aligning tube 82. The lower end of this tube carries an induction coil 84 which detects and transmits as electrical pulses signals from the rotating bladed turbine. The coil portion 84 fits within the cavity 66 formed in the turbine mount 39. The mount and tubes are made of non-magnetic stainless steel or, if required because of a particular environment, of Monel or other non-magnetic metals or plastic.

The inner aligning tube 82 engages the outer end and side of coil 84 to retain this coil in the cavity 66. In spaced alignment the inner and outer tubes 82 and 118 lead to the alignment member 32. The inner tube member is guided by and is locally retained by an inner collar portion 88. A recess 90 snugly receives the outer probe stem 118. A drive screw 38 secures the outer tubular member 118 to the upper body and alignment member 32 only after alignment has been made of the inner tubular member 82 with the upper body or alignment member 32. A stainless steel taper pin 92 is carried in and mounts in a hole 94 formed in member 32. This taper pin enters a hole 96 formed in the inner tubular member 82. Diametrically opposite this tapered pin and mounted in a threaded hole 98 in member 32 is a stainless, socket-head set screw 100. The inner end of this screw enters a hole 102 in the inner tubular member 82. Conductors 104 and 106 lead to connections to, or are extensions of lead conductors in the cable 36. The cable connector 34 is shown as mounted in a tapered and threaded hole 108 formed in the hex-sided aligning body 32.

The screws and taper pin 96 insure that the axis of the bladed turbine 24 is precisely aligned with and normal to the face of the aligning body 32. The screw 38 identifies this face and a decal (not shown) on this body may also give additional instructions for alignment and use.

Use and Operation

As reduced to practice, the flow meter probe of this invention consists of a tubular stainless steel support and a molded bladed turbine. This turbine contains a small sealed magnet as carried by the hub of the turbine. This turbine when centered in the fluid flow stream spins friction-free on shaft 126 at a speed which is directly proportional to the velocity of the fluid. Each revolution of the turbine produces an electrical pulse in a coil sealed in the tubular support. Hence, in a filled pipe or duct of known dimensions each pulse represents a discrete volume of fluid. By remotely counting the total number of pulses there is provided a measure of the total volumeteric flow. By measuring the frequency of the pulses one has a measure of the volumeteric rate of flow. Either total flow (gallons, barrels, etc.,) or rate of flow (gallons/min., millions gallons/day, etc.) may be measured individually or simultaneously. This probe by using only one size of turbine and one small diameter of stem utilizes these fixed factors to provide an inexpensive flow meter which, because of the stem length, may be used in a pipe or conduit which is slightly larger than the turbine diameter or in any larger diameter which may be many times the diameter of the turbine. The installations shown permit using the conventional pipe conduits.

The single unit flow meter may be mounted into an infinite number of pipe sizes and provide the necessary flow measurement. As the probe is smaller than the pipe thread opening through the pipe wall, the probe can be inserted into any pipe larger than the turbine and pipe thread opening as well as into an open flow or stream. Of course, the probe stem, turbine shaft and mountings can be made of any suitable material to accommodate strength and chemical resistance.

The diameter of the turbine is preferably at least an eighth of an inch less than the diameter of the stem. This turbine diameter is the sweep diameter of the blades and the turbine is rotated in response to the fluid flow. The difference in diameter may be greater if desired. The length of the stem which is carried in a compression fitting is usually at least two more inches longer than necessary to position the axis of the turbine on the axis of the flow passageway. This permits the same flow meter to be used in passageways having differing sizes or diameters. Usually, the stem has more than three inches surplus giving a range of 6 inches in which the unit may be mounted. The turbine mount 39 at its extending end extends outwardly several thousandths of an inch and provides a positive mechanical stop. This stop prevents accidental explusion of the stem and meter through a slightly loosened fitting.

Repair and replacement is easily achieved in the apparatus of FIGS. 2 through 5. The bladed turbine 24 is replaced after the probe has been removed from the pipe or conduit 10. Shaft 126 is removed from the turbine mount 39 and if this shaft is not bent and/or not worn it is used again to mount a new bladed turbine 24. When mount 39 and the mounted bladed turbine is to be replaced then a partial disassembly and reassembly is required. Socket-headed set screw 100 is removed and alignment pin 92 is driven out by a drive tool an amount sufficient for removal by pliers or the like. The alignment tube 52 is now moved sufficiently from the outer tube 118 so that screws 81 can be and are removed. The turbine mount 39 is now removed. A new mount with bladed turbine is now brought into place with coil 84 positioned in cavity 66. A new O-ring is likely used and with the holes in mount 29 in alignment, screws 81 are inserted. The turbine mount and alignment tube 52 are now pushed into place in alignment head or upper body 32. Pin 92 and screw 100 are now reinstalled.

Figure 6:
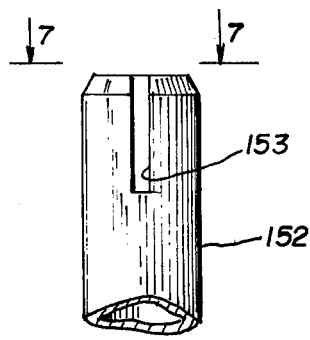
FIG. 6 represents a side view of an upper portion of an alternate embodiment of the internal alignment tube.
Figure 7:
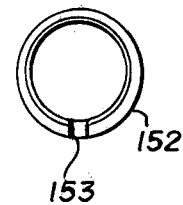
FIG. 7 represents an end view of the tube of FIG. 6, this view taken on the line 7—7 of FIG. 6 and looking in the direction of the arrows.
Figure 8:
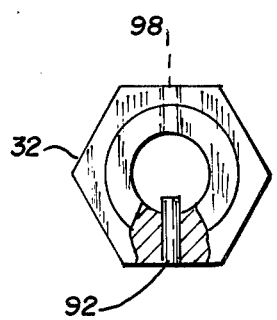
FIG. 8 represents an end view, partly in section, and showing the taper pin more-or-less permanently in position to provide an aligning means for the tube of FIGS. 6 and 7.

Alternate Mounting Assembly As In FIGS. 6, 7 and 8

Referring to the drawings and FIGS. 6, 7 and 8, there is shown an alternate construction of the alignment tube where and when plural disassembly may be anticipated. An alignment tube 152 is provided with a slot 153 formed therein. As reduced to practice, this slot may be about three-quarters of an inch in length and one-sixteenth of an inch in width. The taper pin 92 that is mounted in upper body 32 (FIG. 8) enters the slot 153 to guide tube 152 into place. After sliding into place, the hole 98 in upper body 32 is used as a guide for a drill for hole 102 formed in tube 152. A tap is then manipulated to thread this hole in the tube for installation of set screw 100. The position of slot 153 is also indicated in FIG. 2 with a lead line and number 153 indicated in parenthesis.

The disassembly only requires the removal of screw 100 before the inner alignment tube 152 and associated turbine mount and bladed turbine can be removed from the outer tube 118 for repair or replacement, as above-described.

Figure 9:
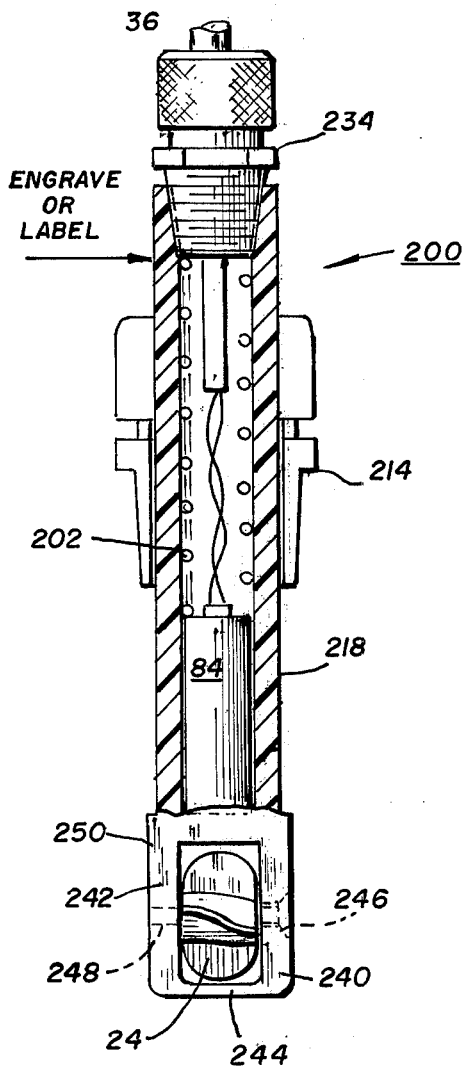
FIG. 9 represents a side view, partly diagrammatic and in section, of yet another probe assembly in which the housing and U-shaped support are of plastic to provide environmental resistance.

Plastic Probe as in FIG. 9

Referring next and finally to FIG. 9, there is depicted an alternate probe assembly which is of plastic and is used to provide a fluid flow reading when the fluid is chemical and metal is not satisfactory. Rather than a probe housing of many parts, as in FIGS. 2 through 5, the probe of FIG. 9 shows a one-piece housing generally indicated as 200. The lower end of this housing has a U-shaped end having front and rear members 240 and 242. A bottom member is also provided and these portions are all integral and join closed end 250. Member 240 has countersunk and threaded hole 246 formed therein as hole 46 is formed in member 40 above. In a like manner drilled hole 248 is formed in the rear member 242 as hole 48 in the member 42 as above.

Above closed end 250 the tubular member 218 continues to a tapered threaded end in which a plastic cord grip 234 is mounted. A swage-type pipe bushing 214 is affixed to the tubular member 218 after the position of the bladed turbine 24 has been established by using an alignment mark engraved or labeled on the outside of upper end or member 218 or 32 (FIGS. 1 and 9). This alignment mark is a matter of convenience for mounting and aligning the bladed turbine in a conduit. The induction coil 84 is mounted in a cavity formed and provided on tubular member 218. A spring 202 holds this coil in place in the lower end of the cavity.

The bladed turbine 24, as seen in FIG. 4, is mounted on a shaft that is satisfactory for the environment in which it is to be used. For example, shaft 126 can be of 316 Stainless Steel, Monel, Kel-F (TM of Minnesota Mining & Mfg. Co. for trifluorochloro ethylene), PVC, Nylon (TM duPont) or any other material that is impervious to the fluid in which it is immersed. The bladed turbine must turn free on the selected shaft.

This plastic probe is usually used in a smaller size pipe such as 1¼ inches to 4 inches diameter and handling corrosive chemicals. Plastic construction is usually not used in larger size pipes because of the lack of strength in the plastic configuration. Chemical resistance is the prime reason for the use of plastic.

Plating of the immersed probe stem and U-shaped housing, when of metal, may also be provided where and when special circumstances dictate.

Terms such as "left", "right", "up", "down", "bottom", "top", "front", "back", "in", "out" and the like are applicable to the embodiments shown and described in conjunction with the drawing. These terms are merely for the purposes of description and do not necessarily apply to the position in which the turbine-type flow meter may be constructed or used.

While particular embodiments of the turbine-type flow meter and alternate embodiments have been shown and described it is to be understood the invention is not limited thereto since modifications may be made within the scope of the accompanying claims and protection is sought to the broadest extent the prior art allows.

What is claimed is:

1. A turbine-type flow responsive device characterized in that the turbine is of molded plastic and has molded therein a magnetic attraction means disposed to cause an electrical pulse to be actuated when said turbine is rotated and the enclosed magnetic means is passed by a magnetic pickup, said flow responsive device disposed for mounting in a hydraulic connection to a through fluid passageway of determined size such as a pipe, said flow responsive device reading the flow rate in said passageway and including: (a) a tubular stem portion which is at least two inches greater in length than the hydraulic connection in which it is to be mounted, said stem having a diameter which is less than the inner diameter of the hydraulic connection in which it is mounted; (b) means for mounting said stem portion in the hydraulic connection and in and through the wall of the fluid conductor and means for orienting and securing said stem in said hydraulic connection so that fluid is prevented from leaking past the mounted stem portion; (c) a U-shaped turbine mount removably secured to and extending from the inner end of the tubular stem; (d) a shaft supported and retained by said U-shaped turbine mount; (e) a turbine of small size whose diameter of rotation is less than the diameter of the fluid passageway in the hydraulic connection which is mounted on the tubular stem, said turbine rotatably supported on the shaft at substantially right angles to the axis of the stem so that the turbine may freely rotate in response to the flow of fluid past the turbine, the diameter of rotation of the turbine being such a small size in relation to the fluid passageway in which it is mounted that the confining walls of the fluid passageway and the resulting distance of the walls to the turbine negate a shroud effect of the walls on the fluid flow read by the turbine, the turbine hub carrying a permanent magnetic device in a manner to provide a balanced turbine, said U-shaped turbine mount assembly and the bladed turbine in mounted condition thereby providing forward, rear and below protection of the turbine with the below connection extending beyond the sweep of the turbine to act as a guard against accidental engagement of the turbine with an interior wall of the fluid conducting passageway and to insure that the turbine blades are a determined spacing from the wall of this passageway; (f) a magnetic pickup carried within and near the end of the tubular stem and adapted to be actuated by the rotation of the turbine; (g) a conductive means attached to the pickup and from this pickup carried within and extending from the stem portion outside the fluid conductor so as to carry from this stem portion pulse signals to an external computing and display means so that when and as the turbine is positioned in the passageway of the fluid conductor with the axis of the turbine and the passageway substantially in coincidence the turbine is caused to be rotated in response to and in relation to the rate of flow of fluid along the passageway, and (h) an O-ring seal carried by the turbine mount and an outer tubular member portion of the stem to provide a fluid-tight seal of the removable mount in the end of the stem.

2. A turbine-type flow responsive device characterized in that the turbine is of molded plastic and has molded therein a magnetic attraction means disposed to cause an electrical pulse to be actuated when said turbine is rotated and the enclosed magnetic means is passed by a magnetic pickup, said flow responsive device disposed for mounting in a hydraulic connection to a through fluid passageway of determined size, such as a pipe, said flow responsive device reading the flow rate in said passageway and including: (a) a tubular stem portion which is at least 2 inches greater in length than the hydraulic connection in which it is to be mounted, said stem having a diameter which is less than the inner diameter of the hydraulic connection in which it is mounted; (b) means for mounting said stem portion in the hydraulic connection and in and through the wall of the fluid conductor and means for orienting and securing said stem in said hydraulic connection so that fluid is prevented from leaking past the mounted stem portion; (c) a U-shaped turbine mount removably secured to and extending from the inner end of the tubular stem; (d) a shaft supported and retained by said U-shaped turbine mount; (e) a turbine of small size whose diameter of rotation is less than the diameter of the fluid passageway in the hydraulic connection which is mounted on the tubular stem, said turbine rotatably supported on the shaft at substantially right angles to the axis of the stem so that the turbine may freely rotate in response to the flow of fluid past the turbine, the diameter of rotation of the turbine being such a small size in relation to the fluid passageway in which it is mounted that the confining walls of the fluid passageway and the resulting distance of the walls to the turbine negate a shroud effect of the walls on the fluid flow read by the turbine, said U-shaped turbine mount assembly and the bladed turbine in mounted condition thereby providing forward, rear and below protection of the turbine with the below connection extending beyond the sweep of the turbine to act as a guard against accidental engagement of the turbine with an interior wall of the fluid conducting passageway and to insure that the turbine blades are a determined spacing from the wall of this passageway; (f) a magnetic pickup carried within the hub of the bladed turbine and including a ring-type magnet mounted and sealed in the hub of the bladed turbine and near the end of the tubular stem and adapted to be actuated by the rotation of the turbine; (g) a conductive means attached to the pickup and from this pickup carried within and extending from the stem portion outside the fluid conductor so as to carry from this stem portion pulse signals to an external computing and display means so that when and as the turbine is positioned in the passageway of the fluid conductor with the axis of the turbine and the passageway substantially in coincidence the turbine is caused to be rotated in response to and in relation to the rate of flow of fluid along the passageway, and (h) an O-ring seal carried by the turbine mount and an outer tubular member portion of the stem to provide a fluid-tight seal of the removable mount in the end of the stem.

3. A turbine-type flow responsive device as in claim 2 in which the turbine is of molded plastic having a cylindrical magnet centrally mounted within the turbine for dynamic balance and with this magnet polarized to provide at least two poles.

4. A turbine-type flow responsive device as in claim 2 in which the diameter of the tubular stem portion is at least an eighth of an inch greater than is the sweep diameter of the turbine carried on the end of said stem.

5. A turbine-type flow responsive device as in claim 2 in which the means for mounting said stem portion in a passageway is a standard compression fitting which is tightened to retain the stem in the mounted condition and in which the turbine end of the stem has an outwardly extending stop bead which provides a positive mechanical stop to prevent accidental expulsion of the stem through said slightly loosened compression fitting.

6. A turbine-type flow responsive device as in claim 5 in which the turbine stem includes two tubular members arranged in a substantially concentric manner as inner and outer tubular portions, the turbine mount slidably mounted within the outer tubular member in which the O-ring seals the lower end of this stem, the turbine mount removably secured to the inner tubular portion by screw means, this inner tubular portion extending to an alignment head above the compression fitting on the outer tubular member and removable means for securing the alignment head to the inner tubular portion in a selected alignment and removable means for securing the alignment head to the outer tubular portion.

7. A turbine-type flow responsive device as in claim 6 in which the means for securing the alignment head to the inner tubular portion includes a set screw in a threaded hole in the alignment head and a mating hole in the inner tubular portion and also includes a tapered pin mountable in a hole in the alignment head and a mating hole in the inner tubular portion.

8. A turbine-type flow responsive device as in claim 6 in which the means for securing the alignment head to the inner tubular portion includes a set screw in a threaded hole in the alignment head and a mating hole in the inner tubular portion and also includes a slot formed in the end of the inner tubular portion, this slot adapted to engage a tapered pin mounted in a hole in the alignment head.

9. A turbine-type flow responsive device characterized in that the bladed turbine is of molded plastic and has molded therein a magnetic attraction means disposed to cause an electrical pulse to be actuated when said turbine is rotated and the enclosed magnetic means is passed by a magnetic pickup, said flow responsive device disposed for mounting in a hydraulic connection to a through fluid passageway of determined size, such as a pipe, said flow responsive device reading the flow rate in said passageway and including: (a) a tubular stem portion of plastic which is at least two inches greater in length than the hydraulic connection in which it is to be mounted, said stem having a diameter which is less than the inner diameter of the hydraulic connection in which it is mounted; (b) means for mounting said stem portion in the hydraulic connection and in and through the wall of the fluid conductor and means for orienting and securing said stem in said hydraulic connection so that fluid is prevented from leaking past the mounted stem portion; (c) a U-shaped turbine mount of plastic and secured to and extending from the end of the tubular stem; (d) a shaft supported and retained by said U-shaped turbine mount; (e) a turbine of small size whose diameter of rotation is less than the diameter of the fluid passageway in the hydraulic connection which is mounted on the tubular stem, said turbine rotatably supported on the shaft at substantially right angles to the axis of the stem so that the turbine may freely rotate in response to the flow of fluid past the turbine, the diameter or rotation of the turbine being such a small size in relation to the fluid passageway in which it is mounted that the confining walls of the fluid passageway and the resulting distance of the walls to the turbine negate a shroud effect of the walls on the fluid flow read by the turbine, the turbine hub carrying a ring-type permanent magnetic device in a manner to provide a balanced turbine, said U-shaped turbine mount assembly and the bladed turbine in mounted condition thereby providing forward, rear and below protection of the turbine with the below connection extending beyond the sweep of the turbine to act as a guard against accidental engagement of the turbine with an interior wall of the fluid conducting passageway and to insure that the turbine blades are a determined spacing from the wall of this passageway; (f) a magnetic pickup carried within and near the end of the tubular stem and adapted to be actuated by the rotation of the turbine, and (g) a conductive means attached to the pickup and from this pickup carried within and extending from the stem portion outside the fluid conductor so as to carry from this stem portion pulse signals to an external computing and display means so that when and as the turbine is positioned in the passageway of the fluid conductor with the axis of the turbine and the passageway substantially in coincidence the turbine is caused to be rotated in response to and in relation to the rate of flow of fluid along the passageway.

10. A turbine-type flow responsive device as in claim 9 in which the shaft which supports the bladed turbine is of a plastic which is resistant to the fluid in which it is to operate and measure.

* * * * *